United States Patent Office 3,070,106
Patented Dec. 25, 1962

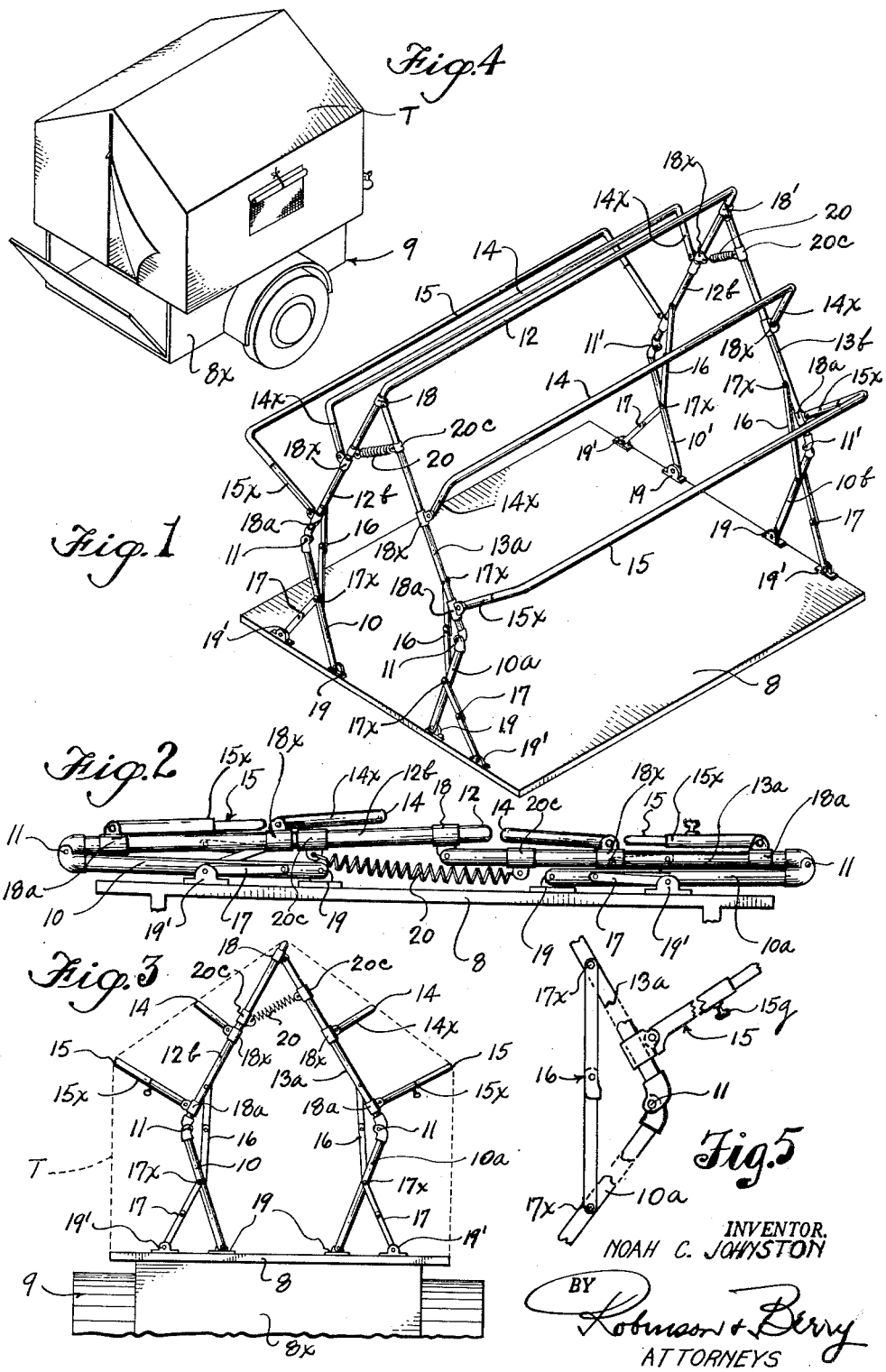

3,070,106
TENT FRAME
Noah C. Johnston, Box 75, Quilcene, Wash.
Filed Sept. 1, 1960, Ser. No. 53,776
3 Claims. (Cl. 135—4)

This invention relates to tent frames and more particularly to a collapsible and erectable frame structure of joined metal tubing or other suitable members that is designed, when erected, for supporting a tent thereover.

More specifically stated, the present invention pertains to improvements in the manner of constructing tent frames for tents that are designed for use on a platform or floor such as, for example, a floor built or mounted on a trailer body, or on a car top; it being the primary object of the present invention to provide a frame structure that will properly, safely and effectively support a tent thereover and which frame structure may be readily collapsed against the floor or supporting surface for travel or storage of the vehicle or at other times, as may be desired or required.

It is also an obect of the present invention to provide a collapsible, metal frame structure comprising a practical minimum of parts; which parts are hingedly, pivotally and adjustably joined for their easy and ready adjustment between erected and collapsed positions; which frame structure is relatively light in weight; which can be adjusted from one position to another by one person and which, in its erected position, is rigid, secure and serviceable for its intended use.

Still further objects of the present invention reside in the details of construction of its various parts; in their combination and relationship and in the mode of use of the frame structure, as will hereinafter be fully described.

In accomplishing the above mentioned and other objects of the invention, I have provided the improved details of construction, the preferred forms of which are illustrated in the accompanying drawings, wherein:

FIG. 1 is a perspective view of the tent frame structure of the present invention as erected on a floor for support of a tent thereover.

FIG. 2 is an end view of the tent frame structure, showing the pivotally joined parts in larger scale and as collapsed against the floor or platform on which the frame structure is secured.

FIG. 3 is a view, at a reduced scale, indicating, in dash lines, the disposition of a tent over the erected frame structure, as mounted on the bed of a trailer type vehicle.

FIG. 4 illustrates in perspective, the disposition of a tent, as supported by a tent frame structure of the present invention, on a two-wheeled trailer.

FIG. 5 is an enlarged detail of construction of the tent frame structure.

Referring more in detail to the drawings:

In FIG. 4, I have shown a tent T of a common type as applied over the erected frame structure which is not therein shown, of the present invention, and in FIG. 1, the frame structure has been illustrated in its erected position, apart from the tent. FIGS. 1 and 3 further indicate that the tent frame structure is erected on a floor or platform 8. Such a floor might be built upon the ground, or upon the bed or body 8x of a trailer type of vehicle, such as designated by numeral 9 in FIG. 4. It is to be understood, however, that whether the frame structure be erected on a platform of a trailer bed or other type of supporting floor, it would remain substantially the same. Frames of this kind have been found quite practical for tents of six by eight feet in floor dimensions, but can be made for tents that vary from these dimensions, in accordance with requirements or desires.

The tent frame structure, in its present preferred form of construction, as shown best in FIG. 1, comprises front and rear end leg forming portions 10 and 10' located at one side of the structure in paired relationship with legs 10a and 10b located at the other side. The legs 10 and 10' at the left side of the structure, as shown in FIG. 1, are joined at their top ends by what is herein designated as a ridge forming frame member which establishes the front to back length of the tent frame. This frame member comprises the straight longitudinal tube 12 which has downwardly and outwardly inclined legs 12b—12b of equal length at its opposite ends which are secured at their lower ends by hinge type joints, as at 11—11', to the upper ends of the previously mentioned legs 10 and 10', respectively; these joints being so formed that the ridge forming frame member can be swung downwardly toward and upwardly from the legs 10 and 10'.

The upper ends of the legs 10a—10b, located at the right hand side of the frame structure, as shown in FIG. 1, are similarly attached by hinge type joints, designated at 11 and 11', to the lower ends of upwardly and inwardly inclined links 13a—13b which, in turn, are hingedly attached at their upper ends to clamping collars 18—18' that are applied about the upper end portions of the legs 12b—12b, respectively, of the longitudinal ridge member 12. These hinged connections provide that the legs 12b—12b and links 13a—13b may be swung inwardly and downwardly toward their supporting legs 10—10' and 10a—10b in the collapsing of the tent frame as presently will be explained.

The legs 10—10' and 10a—10b, are pivotally fixed at their lower ends by rivets, bolts or pins, to individual securing flanges or blocks 19 which are fixedly secured to the platform or floor 8 on which the frame is mounted. All blocks 19 are at the same level and, at opposite ends of the frame, are in paired transversely alignment and may be screwed, nailed or otherwise fixed in place on the floor. Located at the outside of and in alignment with the flanges or blocks 19 at each end of the tent frame are similar blocks 19' that are likewise fixed in place on the floor. Extended between these blocks 19' and the medial portions of corresponding inclined legs, 10—10' and 10a—10b, are toggle type link braces 17, each comprising a pair of links that are hingedly joined at their inner ends and with one link pivoted at its upper end, as at 17x in FIG. 1, to the inclined leg 10 or 10' and the companion link being pivoted at its lower end to the corresponding block 19'. When straightened out, these toggle links 17 coact with other parts to assist in retaining the frame legs rigidly and properly in the erected postions of FIG. 1, and when broken downwardly and inwardly, they permit the outward and downward swinging of the legs 10—10' and 10a and 10b and the inward and downward swinging of the parts 12b and 12b and 13a—13b attached thereto as previously explained. Also, there are toggle links 16 that are similar to the toggle links 17 and which, in the straightened out position, as shown, hold the hingedly joined parts rigidly in erected positions and when folded together, permit the downward collapse of the upper frame structure.

The toggle links 16 and 17 as here employed are equipped with the usual "over dead center stops" whereby the hingedly joined links will be held rigid and against collapse when in the positions shown in FIG. 1 but which permits collapse and folding together of the linkage when broken in the opposite direction.

Near their upper ends, the frame legs 12b—12b of the ridge member are joined to the links 13a—13b, by coil springs 20, these springs being attached at their ends to clamp collars 20c that are adjustably applied to the joined parts. These springs 20, under tension, operate to aid in the erection of the frame and to ease its collapse, with the breaking of the hinged toggle links 16 and 17 for this purpose.

Extending lengthwise of, and at each of the opposite sides of the ridge forming frame member 12 are what has herein been designated to be swing frames 14 and 15; each of the frames 14 comprising a straight full length member having legs 14x—14x at opposite ends which are hingedly attached at their lower or inner ends to clamp collars 18x adjustably applied about the medial portions of the legs 12b—12b at the left side of the frame structure, and about the links 13a—13b at the right side. The frames 15 each comprises a member 15 which extends to the full length of the tent frame, and has legs 15x—15x at its opposite ends that are hingedly attached at their ends to clamp collars 18a that are adjustably applied about the legs 12b—12b and links 13a—13b.

The legs 15x of these swing frames 15 are each formed in two telescopically assembled tubular sections which may be adjusted in length, as required or desired. The adjustment is retained by winged bolts or screws that are threaded into the outer member to clamp at its inner end against the inner tubular member, as at 15g in FIG. 5. These swing frames 14 and 15 have their inner end portions hinged to the collars 18a and are equipped with outwardly extending stops 15s so positioned as to engage the collars that they cannot swing outwardly and downwardly beyond the positions of FIG. 1, relative to their supporting members.

The frames 14 and 15 may be swung from positions lying against the parts 12b—12b and 13a and 13b, to positions directed outwardly from their supports as shown in FIGS. 1 and 3, to cooperate in support of the tent top in proper erected postion. However in the process of collapsing the frame these parts will be swung inwardly toward and laid against the underlying parts in a compactly collapsed position as in FIG. 2.

Tent frames of this kind may be made in various sizes to meet desires, conditions or requirements and may be made of various materials and the hinged or pivoted joints and clamps may be altered or changed as required to best suit the materials used.

Assuming that the tent frame structure comprises parts that are formed and joined as has been described and illustrated, and assuming that the frame has been erected on a base 8 and has the tent supported thereby as in FIGS. 3 and 4, the collapsing sequence of operations is as follows:

First, the frames 14 and 15 are reduced in height and are swung upwardly and inwardly against their supports. Then, downward pressure is applied on the toggle linkage 17—17 to start them to break downwardly. Then, by grasping the toggle linkage 16 and leg 10 or 10a, first at one side then the other, push and pull as required to break the linkage 16 inwardly and permit the inclined legs 10—10a to be pushed away from each other. This is repeated at the opposite end of the frame. As the frame is thus somewhat lowered, grasp the cross member of frame 12 and continue to pull down until member 12 reaches the fully collapsed position of FIG. 2. With this complete collapsing, the springs 20—20 are placed under an appreciable tension that aids later in the erection of the frame but which is ineffective at complete collapse but immediately becomes active with the upward movement of the ridge member 12.

To raise or erect the frame, first lift longitudinal frame member 12 toward erected position and when partly raised, take hold of opposite, outwardly diverging legs 10—10a or 10'—10b and pull together until frame reaches its full height. Then press toggle linkage 16—17 at both ends into fully extended rigid position and the structure will assume the erected position of FIG. 1, the longitudinally extending frames 14 are swung to the desired positions of FIG. 3 to support the tent top. Then the frames 15 at opposite sides are swung outwardly and downwardly and the telescoping leg sections thereof are adjusted in length as desired or required and secured in adjustment by the set screws 15g.

What I claim as new is:

1. A collapsible supporting frame structure for a rectangular tent; said frame structure comprising a pair of corner legs at each of its opposite ends, equipped at their lower ends with means for their hinged securement to a frame supporting floor that adapts the legs at the same end of the frame to be swung outwardly on their hinge axes, in the same vertical plane in a direction across the end of the frame, between upwardly directed, erected positions and frame structure collapsing positions lying against the frame supporting floor, a ridge forming member including supporting legs at its opposite ends hingedly secured at their lower ends, respectively, to the upper ends of the corner legs at one side of the tent frame and a pair of links hingedly secured at their lower ends to the upper ends of the corner legs at the other side of the tent frame and at their upper ends to the upper end portions of the legs of the ridge forming member, and means for supporting the four corner legs in predetermined upwardly directed positions to thereby retain the tent frame structure in its erected, tent supporting position and adapted to allow collapsing of the tent frame structure against the frame supporting floor.

2. The tent frame structure recited in claim 1 including also swing frames extended between the opposite ends of said frame structure at its opposite sides and hinged to the legs of the ridge member and paired links attached thereto and adapted to be swingingly adjusted between positions folded against the members to which they are hingedly attached and positions extending outward therefrom for their support of the tent; said swing frames being hinged to clamp collars and equipped with stops to engage therewith to definitely limit the outward swinging movement of the frames at a fixed position.

3. The tent frame structure of claim 1 wherein springs are attached at their ends, to the upper end portions of the legs of the ridge member and the upper end portions of the corresponding links of said pair of links; said springs being placed under increasing tension with collapsing movement of the frame structure to retard the action of the downward movement thereof and becomes under restrained tension incident to complete collapse and becomes unrestrained with the initial erecting movement of the ridge structure to aid in erection.

References Cited in the file of this patent

UNITED STATES PATENTS

| | | |
|---|---|---|
| 1,650,323 | Byars | Nov. 22, 1927 |
| 2,461,014 | Welsh | Feb. 8, 1949 |
| 2,658,212 | Green | Nov. 10, 1953 |
| 2,960,993 | Holmstrom | Nov. 22, 1960 |